(12) United States Patent
Bauer

(10) Patent No.: US 7,239,952 B2
(45) Date of Patent: Jul. 3, 2007

(54) REDUCED ORDER PARAMETER IDENTIFICATION FOR VEHICLE ROLLOVER CONTROL SYSTEM

(75) Inventor: Geoffrey Burke Bauer, Northville, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 253 days.

(21) Appl. No.: 11/007,545

(22) Filed: Dec. 8, 2004

(65) Prior Publication Data

US 2006/0122758 A1  Jun. 8, 2006

(51) Int. Cl.
*G06F 19/00* (2006.01)

(52) U.S. Cl. ............... 701/70; 701/72; 701/124; 340/440; 280/5.5; 280/5.506

(58) Field of Classification Search ............ 701/36–38, 701/70–72, 91, 124; 340/425.5, 429, 440; 280/755–756, 5.5, 5.502, 5.506
See application file for complete search history.

(56) References Cited

U.S. PATENT DOCUMENTS

| | | | |
|---|---|---|---|
| 4,927,173 A | 5/1990 | Clifton, Jr. | |
| 5,610,575 A | 3/1997 | Gioutsos | |
| 5,742,918 A | 4/1998 | Ashrafi et al. | |
| 5,742,919 A | 4/1998 | Ashrafi et al. | |
| 5,787,375 A | 7/1998 | Madau et al. | |
| 5,790,966 A | 8/1998 | Madau et al. | |
| 5,809,434 A | 9/1998 | Ashrafi et al. | |
| 5,825,284 A | 10/1998 | Dunwoody et al. | |
| 5,852,787 A | 12/1998 | Fodor et al. | |
| 5,948,027 A | 9/1999 | Oliver, Jr. et al. | |
| 5,971,503 A | 10/1999 | Joyce et al. | |
| 6,053,583 A | 4/2000 | Izumi et al. | |
| 6,065,558 A | 5/2000 | Wielenga | |
| 6,122,568 A | 9/2000 | Madau et al. | |
| 6,158,274 A | 12/2000 | Guo et al. | |
| 6,169,939 B1 | 1/2001 | Raad et al. | |
| 6,170,594 B1 * | 1/2001 | Gilbert | 180/282 |
| 6,220,095 B1 | 4/2001 | Fennel et al. | |
| 6,233,505 B1 | 5/2001 | Kranz et al. | |
| 6,249,721 B1 | 6/2001 | Lohberg et al. | |
| 6,263,261 B1 | 7/2001 | Brown et al. | |
| 6,282,474 B1 | 8/2001 | Chou et al. | |
| 6,324,446 B1 | 11/2001 | Brown et al. | |

(Continued)

FOREIGN PATENT DOCUMENTS

DE   3600708   7/1987

(Continued)

OTHER PUBLICATIONS

Automotive Control Systems For Engine, Driveline and Vehicle, ISBN 3-540-66922-1, U. Kiencke, L. Nielsen, pp. 392-395, 2000, Berlin, New York, Springer-Verlag.

(Continued)

*Primary Examiner*—Y. Beaulieu

(57) ABSTRACT

A system that detects a lateral acceleration and roll rate of the vehicle and estimates a mass distribution parameter. The system then generates a tuned mass distribution parameter that is based on the the lateral acceleration, the roll rate, and the mass distribution parameter and introduces the tuned mass distribution parameter to a rollover stability control system.

8 Claims, 1 Drawing Sheet

U.S. PATENT DOCUMENTS

| | | |
|---|---|---|
| 6,327,526 B1 | 12/2001 | Hagan |
| 6,330,496 B1 | 12/2001 | Latarnik et al. |
| 6,332,104 B1 | 12/2001 | Brown et al. |
| 6,338,012 B2 | 1/2002 | Brown et al. |
| 6,347,541 B1 | 2/2002 | Maleki |
| 6,351,694 B1 | 2/2002 | Tseng et al. |
| 6,353,777 B1 | 3/2002 | Harmison et al. |
| 6,356,188 B1 | 3/2002 | Meyers et al. |
| 6,364,435 B1 | 4/2002 | Gronau et al. |
| 6,366,844 B1 | 4/2002 | Woywod et al. |
| 6,374,163 B1 | 4/2002 | Lou et al. |
| 6,397,127 B1 | 5/2002 | Meyers et al. |
| 6,409,286 B1 | 6/2002 | Fennel |
| 6,424,907 B1 | 7/2002 | Rieth et al. |
| 6,434,451 B1 | 8/2002 | Lohberg et al. |
| 6,435,626 B1 | 8/2002 | Kostadina |
| 6,438,464 B1 | 8/2002 | Woywod et al. |
| 6,471,218 B1 | 10/2002 | Burdock et al. |
| 6,477,480 B1 | 11/2002 | Tseng et al. |
| 6,496,758 B2 | 12/2002 | Rhode et al. |
| 6,526,334 B1 | 2/2003 | Latarnik et al. |
| 6,526,342 B1 | 2/2003 | Burdock et al. |
| 6,529,803 B2 | 3/2003 | Meyers et al. |
| 6,554,293 B1 * | 4/2003 | Fennel et al. ............ 280/5.502 |
| 6,556,908 B1 | 4/2003 | Lu et al. |
| 6,593,849 B2 | 7/2003 | Chubb et al. |
| 6,614,343 B1 | 9/2003 | Fennel et al. |
| 6,631,317 B2 | 10/2003 | Lu et al. |
| 6,654,674 B2 | 11/2003 | Lu et al. |
| 6,658,342 B1 | 12/2003 | Hac |
| 6,671,595 B2 | 12/2003 | Lu et al. |
| 6,789,002 B1 * | 9/2004 | Hac et al. ....................... 701/1 |
| 6,799,092 B2 | 9/2004 | Lu et al. |
| 6,904,350 B2 * | 6/2005 | Lu et al. ....................... 701/70 |
| 7,107,136 B2 * | 9/2006 | Barta et al. ................... 701/70 |
| 2001/0008986 A1 | 7/2001 | Brown et al. |
| 2002/0139599 A1 | 10/2002 | Lu et al. |
| 2003/0058118 A1 * | 3/2003 | Wilson ....................... 340/679 |
| 2003/0065430 A1 | 4/2003 | Lu et al. |
| 2003/0100979 A1 | 5/2003 | Lu et al. |
| 2003/0116373 A1 | 6/2003 | Miller et al. |
| 2003/0130775 A1 | 7/2003 | Lu et al. |
| 2003/0130778 A1 | 7/2003 | Hrovat et al. |
| 2003/0163231 A1 | 8/2003 | Meyers et al. |
| 2004/0041358 A1 | 3/2004 | Hrovat et al. |
| 2004/0111208 A1 | 6/2004 | Meyers et al. |
| 2004/0199314 A1 | 10/2004 | Meyers et al. |

FOREIGN PATENT DOCUMENTS

| | | |
|---|---|---|
| DE | 4242788 | 7/1993 |
| JP | 63116918 | 5/1988 |
| WO | WO 97/47485 | 12/1997 |
| WO | WO 99/30941 | 6/1999 |
| WO | WO 99/30942 | 6/1999 |
| WO | WO 00/03887 | 1/2000 |
| WO | WO 00/03900 | 1/2000 |
| WO | WO 01/12483 A1 | 2/2001 |
| WO | WO 02/36401 A1 | 3/2002 |
| WO | WO 02/100696 1 | 12/2002 |
| WO | WO 3/002392 A1 | 1/2003 |

OTHER PUBLICATIONS

Recursive Least Squares Estimation, pp. 1-20, Lecture Material adopted from S. Haykin cited below, no date.

S. Haykin, Adaptive Filtering Theory, Prentice Hall, 2002, pp. 436-465.

SAE Technical Paper Series 2002-01-1183, Mar. 4-7, 2002, pp. 1-3; Estimation of Tire-Road Friction Using Tire Vibration Mode; Takaji Umeno, Eichi Ono, Katsuhiro Asano, Shoji Ito, Akira Tanaka, Yoshiyuki Yasui and Mamoru Sawada.

* cited by examiner

REDUCED ORDER PARAMETER IDENTIFICATION FOR VEHICLE ROLLOVER CONTROL SYSTEM

BACKGROUND

This invention relates to a system and method of protecting against rollover in a motor vehicle.

Dynamic control systems have been recently introduced in automotive vehicles for measuring the body characteristics of the vehicle and controlling the dynamics of the vehicle based on the measured body characteristics. For example, certain systems measure vehicle characteristics to prevent vehicle rollover and for tilt control (or body roll). Tilt control maintains the vehicle body on a plane or nearly on a plane parallel to the road surface, and rollover control maintains the vehicle wheels on the road surface. Certain systems use a combination of yaw control and tilt control to maintain the vehicle body horizontal while turning. Commercial examples of these systems are known as active rollover prevention (ARP) and rollover stability control (RSC) systems.

The spectrum of conditions that may occur during the operation of the vehicle is too large to be practically evaluated during the development and production of the vehicle. As a result, the tuning of the rollover stability control system for the vehicle is typically performed with an extreme roof load to provide sufficient confidence that the system will perform suitably over road conditions that the vehicle will experience when being driven.

However, when the rollover stability control system is tuned in the roof-loaded condition, the gains are higher than those that would result from tuning in the normal-loaded condition. Thus, the system becomes very sensitive to small disturbances.

Moreover, conventional systems consider the longitudinal vehicle dynamics to estimate the mass of the system. Hence, these systems do not provide an indication about the way the mass is distributed with respect to the roll axis (i.e., the roll moment of inertia).

SUMMARY

In satisfying the above need, as well as overcoming the enumerated drawbacks and other limitations of the related art, the present invention provides a system and method that estimates a parameter related to the mass of the loaded vehicle as well as the mass distribution.

In a general aspect of the invention, the system detects a lateral acceleration and roll rate of the vehicle and estimates a mass distribution parameter. The system then generates a tuned mass distribution parameter that is based on the the lateral acceleration, the roll rate, and the mass distribution parameter and introduces the tuned mass distribution parameter to a rollover stability control system.

Further features and advantages will become apparent from the following description, and from the claims.

DETAILED DESCRIPTION

Figure 1:
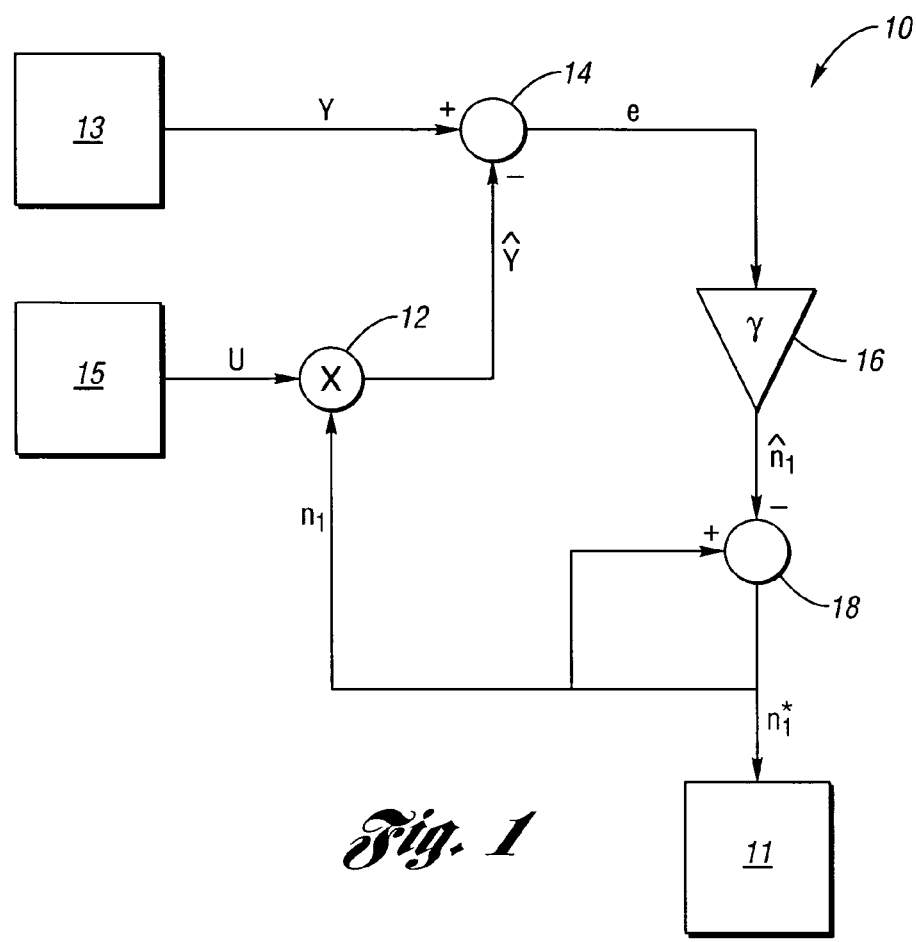
FIG. 1 is a block diagram of a system that identifies a parameter related to the mass of a vehicle and the mass distribution in accordance with the invention.

Referring now to FIG. 1, a system embodying the principles of the present invention is illustrated therein and designated at 10. The system 10 provides corrected parameters for a rollover stability control system 11 implemented within a vehicle 100 (FIG. 2), to reduce the rollover propensity of the vehicle in actual driving conditions. Thus, the system 10 is able to adjust for changes in the load on the vehicle as well as the distribution of the load in real time.

Figure 2:
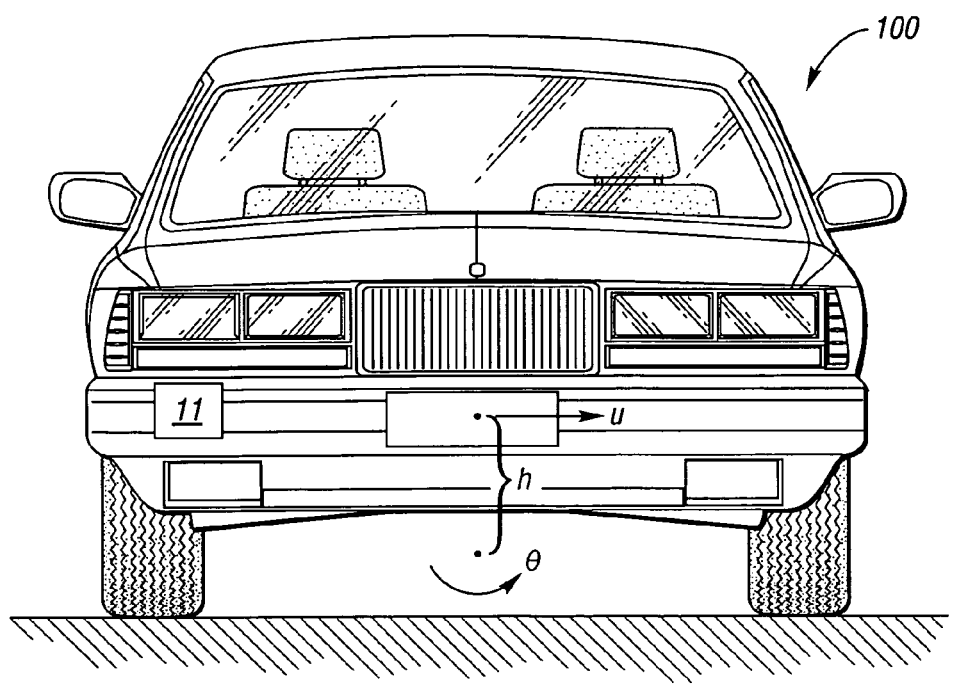
FIG. 2 is a free-body diagram of a vehicle illustrating forces acting on the vehicle.

With reference to FIG. 2, the following roll model is implemented in the system 10. The roll model requires that the sum of the moments is zero, that is, $$\Sigma M = O \qquad \text{Eqn. 1}$$

which yields $$I\ddot{\theta} = mhu - K\theta - c\dot{\theta}, \qquad \text{Eqn. 2}$$

where

I is the moment of inertia in the roll direction,
$\ddot{\theta}$ is the roll acceleration,
$\dot{\theta}$ is the roll rate,
$\theta$ is the roll angle,
m is the total mass,
K is the roll stiffness,
c is the roll damping coefficient,
u is the lateral acceleration, and
h is the height of the center of gravity from the roll axis.

Rearranging Eqn. 2 provides $$\ddot{\theta} = \frac{-c}{I}\dot{\theta} - \frac{K}{I}\theta + \frac{mh}{I}u \qquad \text{Eqn. 3}$$

Thus, in state space, the continuous time system roll model is $$\dot{x}(t) = Ax(t) + Bu(t),$$

x(0)=0 if the initial time is set to zero, $$\text{and } y(t) = Cx(t) \qquad \text{Eqn. 4}$$

where $$x(t) = \begin{bmatrix} \theta \\ \dot{\theta} \end{bmatrix}, \dot{x}(t) = \begin{bmatrix} \dot{\theta} \\ \ddot{\theta} \end{bmatrix}$$

$$A = \begin{bmatrix} 0 & 1 \\ -\frac{K}{I} & -\frac{c}{I} \end{bmatrix} B = \begin{bmatrix} 0 \\ -\frac{m \cdot h}{I} \end{bmatrix} \text{ and } C = [0 \ 1]$$

The C matrix is chosen depending on the type of sensor employed. In this case, a roll rate sensor is being employed, hence C=[0 1].

Note that the above discussion is directed to obtaining a solution for the state vector x(t) in continuous time. Therefore, the system described in Eqn. 4 is typically discretized according to the expression $$\dot{x}(k) = A_d x(k-1) + B_d u(k)$$

$$y(k) = Cx(k) \qquad \text{Eqn. 5}$$

where k identifies the $k^{th}$ time step and $$A_d = I_n + AT,$$

$$B_d = BT,$$

and where $I_n$ is the nth order identity matrix, which in this case is a second order identity matrix, and T is the time step.

Converting the discretized state space equation (Eqn. 5) to transfer function space identified here as z yields:

$$\frac{Y(z)}{U(z)} = C(zI_n - A_d)^{-1} B_d, \qquad \text{Eqn. 6}$$

thus, $$\frac{Y(z)}{U(z)} = \frac{n_1 \cdot z^{-1} - n_2 \cdot z^{-2}}{1 + d_1 \cdot z^{-1} + d_2 \cdot z^{-2}} \qquad \text{Eqn. 7}$$

where $$n_1, n_2 = \frac{Tmh}{I},$$

$$d_1 = \frac{Tc - 2I}{I}, \text{ and}$$

$$d_2 = I - Tc + T^2 K$$

Hence, U(z) is the lateral acceleration in z space and Y(z) is the corresponding roll rate.

Expanding Eqn. 7 yields:

$$Y(z) + d_1 Y(z) z^{-1} + d_2 Y(z) z^{-2} = n_1 U(z) z^{-1} - n_2 U(z) z^{-2}, \text{ or}$$

$$Y(z) = n_1 U(z) z^{-1} - n_2 U(z) z^{-2} - d_1 Y(z) z^{-1} - d_2 Y(z) z^{-2} \qquad \text{Eqn. 8}$$

which can be generalized as $$Y(\cdot) = U^T(\cdot) * \hat{\Theta} \qquad \text{Eqn. 9}$$

where $\hat{\Theta} = [n_1, n_2, d_1, d_2]$ is the parameter vector and $Y(\cdot)$, $U^T(\cdot)$ are known (i.e., measured).

Since $d_1$, and $d_2$ are not functions of m and h, $d_1$ and $d_2$ can be calculated in advance so that only $n_1$ and $n_2$ need to be estimated. Observing that $n_1 = n_2$, the inverse z transform of the transfer function is $$Y(k) + d_1 Y(k-1) + d_2 Y(k-2) = n_1 [U(k-1) - U(k-2)], \qquad \text{Eqn. 10}$$

In this way, the variables of Eqn. 9 are scalar. The estimated parameter $n_1$ is a function of the vehicle mass and moment of inertia of the body about the roll axis.

Turning again to FIG. 1, the system 10 detects a lateral acceleration U from accelerometer 13 and a roll rate Y from a roll rate sensor 15 and estimates a mass distribution parameter $n_1$. The system 10 then multiplies the mass distribution parameter $n_1$ with the lateral acceleration U in a multiplier 12 to define an estimated roll rate $\hat{Y}$. The roll rate Y is compared in a comparator 14 with the estimated roll rate $\hat{Y}$ to define an error parameter e. The system 10 includes a tuning filter 16 which multiplies the error parameter e with the gain γ of the tuning filter 12 to define a revised mass distribution parameter $\hat{n}_1$. The system 10 also includes a second comparator 18 which compares the revised mass distribution parameter $\hat{n}_1$ with the estimated mass distribution parameter $n_1$ to define a tuned mass distribution parameter $n^*_1$ that is introduced to the rollover stability control system 11.

The estimate for the mass distribution parameter $n_1$ can be performed by a recursive least squares (RLS) method or any other suitable method. An example of an RLS algorithm used in conjunction with the system shown in FIG. 1 is phi=P*u;
gamma(k)=phi/(u*phi+lambda);
Y_hat(k)=u*n_hat(:,k-2);
n_hat(:,k-1)=n_hat(:,k-2)+gamma(k)*(Y(k)-Y_hat(k));
if (abs(U(k))>3
    n_hat(:,k-1)=n_hat(:,k-2);
end if % if
P=(eye(sysorder)-gamma(k)*u)*P/lamda;

where the inputs:
U(k) is the current measured lateral acceleration,
u=(U(k-1)-U(k-2)), and
Y(k)=current measured roll rate;

the estimates:
Y_hat(k) is the estimated value of the left hand side of Eqn. 10, and
n_hat(k) is the estimated value of $n_1$;

the tunable parameters:
P is the convariance matrix in which the only initial condition, P(0), is chosen,
Lambda is a forgetting factor which lets the algorithm rely less on the older estimated values, and
the value "3" is a number to which U(k) is compare is also a tunable value depending on the roll model employed;

and the other variables:
phi is an intermediate variable used to simplify the notation and reduce processing time,
gamma(k) is the gain,
k is the current time step, such that k−1 is the prior time step, and k−2 is two steps prior,
sysorder is the order of the system to be estimated, which in this case is one,
eye is the identity matrix, and
abs is the absolute value.

Other embodiments are within the scope of the following claims.

What is claimed is:

1. A method of protecting against rollover in a motor vehicle, the method comprising:
    detecting a lateral acceleration of the motor vehicle;
    detecting a roll rate of the motor vehicle;
    estimating a mass distribution parameter;
    generating a revised mass distribution parameter;
    generating a tuned mass distribution parameter based on the lateral acceleration, the roll rate, and a comparison between the mass distribution parameter and the revised mass distribution parameter; and
    introducing the tuned mass distribution parameter to a rollover stability control system of the motor vehicle.

2. The method of claim 1 further comprising multiplying the mass distribution parameter with the lateral acceleration of the motor vehicle to define an estimated roll rate, the revised mass distribution parameter being based on the estimated roll rate.

3. The method of claim 2 further comprising comparing the roll rate with the estimated roll rate to define an error parameter.

4. The method of claim 3 further comprising multiplying the error parameter with the gain of a tuning filter to define the revised mass distribution parameter.

5. A system of protecting against rollover in a vehicle, comprising:
- a sensor which measures a lateral acceleration of the vehicle;
- a second sensor which measures a roll rate of the vehicle;
- a multiplier which multiplies an estimated mass distribution parameter with the lateral acceleration to define an estimated roll rate; and
- a comparator which receives information regarding the roll rate, the estimated roll rate, and the estimated mass distribution parameter and generates a tuned mass distribution parameter that is transmitted to a rollover stability control system of the vehicle.

6. The system of claim 5 further comprising a second comparator which compares the roll rate with the estimated roll rate to define an error, the information received by the first comparator being based on the error and the estimated mass distribution parameter.

7. The system of claim 6 further comprising a tuning filter which multiplies the error with a gain to define a revised mass distribution parameter.

8. The system of claim 7 wherein the first comparator compares the revised mass distribution parameter with the estimated distribution parameter to define the tuned mass distribution parameter.

* * * * *